United States Patent
Coates et al.

(10) Patent No.: US 6,816,218 B1
(45) Date of Patent: Nov. 9, 2004

(54) HOMEOTROPICALLY ALIGNED LIQUID CRYSTAL LAYER AND PROCESS FOR THE HOMEOTROPIC ALIGNMENT OF LIQUID CRYSTALS ON PLASTIC SUBSTRATES

(75) Inventors: David Coates, Dorset (GB); Owain Llyr Parri, Dorset (GB); Jeremy Lewis Ward, Poole (GB); David Joicey, Poole (GB); Keith Wilbourn, Matthews, NC (US); Colum Dickson, Chester (GB); John Scott, Tarporley (GB)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 09/484,259

(22) Filed: Jan. 18, 2000

Related U.S. Application Data

(63) Continuation of application No. 09/059,297, filed on Apr. 14, 1998.

(30) Foreign Application Priority Data

Apr. 14, 1998 (EP) .............................................. 97106091

(51) Int. Cl.[7] ........................ G02F 1/1337; C09K 19/52
(52) U.S. Cl. ................... 349/123; 349/130; 252/299.01
(58) Field of Search ................................ 349/130, 131, 349/123; 252/299.01

(56) References Cited

U.S. PATENT DOCUMENTS

| | | | | |
|---|---|---|---|---|
| 4,112,157 A | * | 9/1978 | Krueger et al. ............. | 349/130 |
| 4,490,015 A | * | 12/1984 | Kawarada et al. ........... | 349/130 |
| 5,056,898 A | * | 10/1991 | Ma et al. .................... | 349/131 |
| 5,281,450 A | * | 1/1994 | Yaniv .......................... | 427/510 |
| 5,601,884 A | * | 2/1997 | Ohnishi et al. ............. | 349/182 |
| 5,710,609 A | | 1/1998 | Shimada ..................... | 349/130 |
| 5,745,205 A | * | 4/1998 | Kato et al. .................. | 349/125 |
| 5,780,629 A | * | 7/1998 | Etzbach et al. ............. | 544/296 |
| 5,880,801 A | * | 3/1999 | Scherer et al. ............. | 349/130 |
| 6,379,758 B1 | * | 4/2002 | Hanmer et al. ............. | 428/1.1 |

OTHER PUBLICATIONS

H. Birecki, "Liquid Crystal Alignment on Substrate Surfaces, a Collective Phenomenon", Liq. Cry. Ordered Fluids, 1984 (4) 853–864.*

Bahadur, Liquid Crystal Applications and Uses, vol. III, pp. 1–36.*

* cited by examiner

Primary Examiner—Tarifur R. Chowdhury
(74) Attorney, Agent, or Firm—Millen, White, Zelano & Branigan, P.C.

(57) ABSTRACT

Homeotropically oriented layers and films of liquid crystals especially on polymeric substrates. The layers and films, which also can be multi-layered films comprising a homeotropically aligned anisotropic film, are preparable by application of an orientation layer to the substrate. The orientation layer can be either an organic surfactant which is fixed in a matrix of a polymeric material or an inorganic thin layer such as aluminum or $Al_2O_3$.

10 Claims, 1 Drawing Sheet

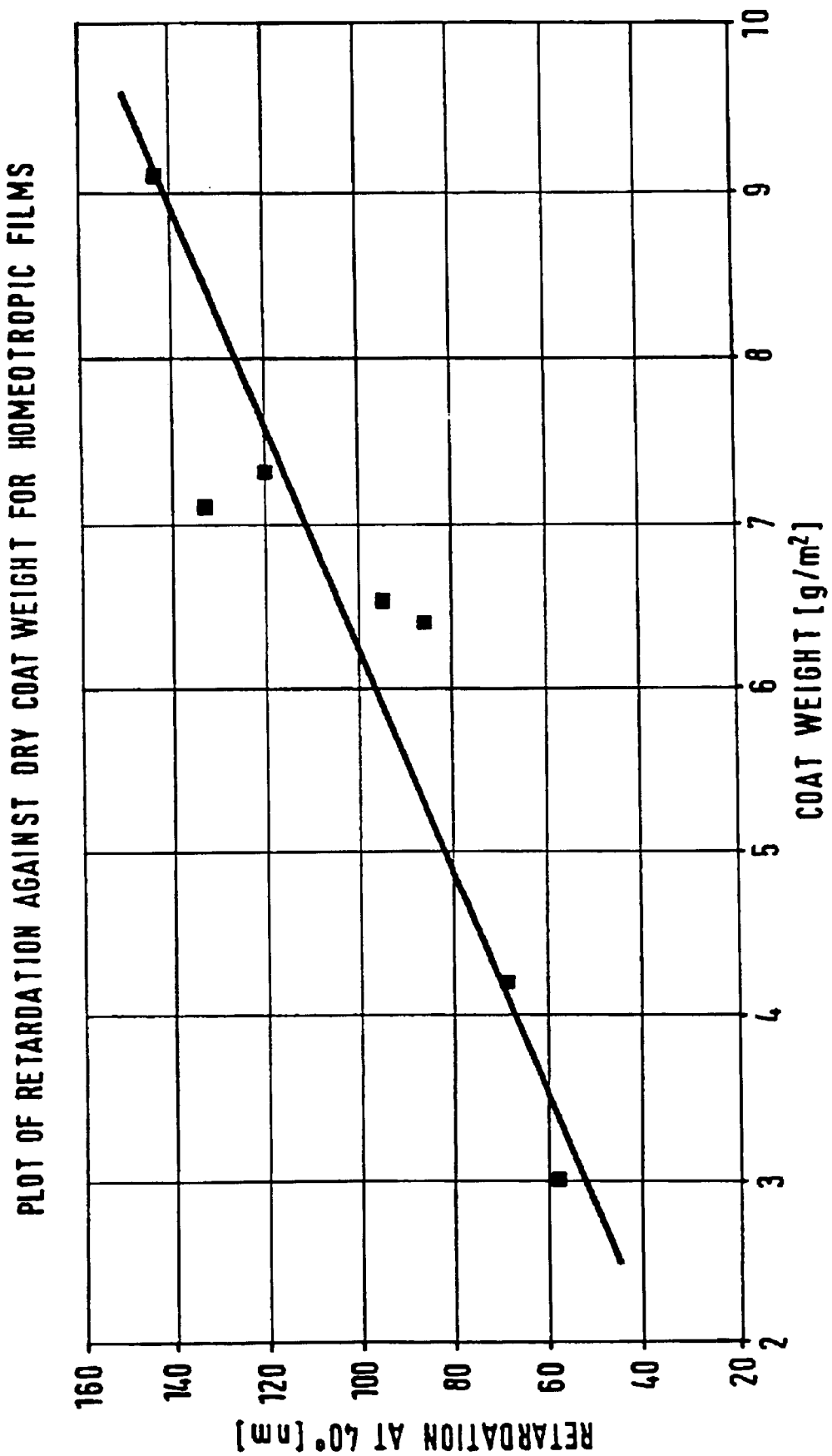

HOMEOTROPICALLY ALIGNED LIQUID CRYSTAL LAYER AND PROCESS FOR THE HOMEOTROPIC ALIGNMENT OF LIQUID CRYSTALS ON PLASTIC SUBSTRATES

This application is a Continuation of application Ser. No. 09/059,297 Filed on Apr. 14, 1998. This application claims priority of European application Ser. No. 97 106 091.8 Filed Apr. 14, 1998.

FIELD OF THE INVENTION

This work aims to find a suitable homeotropic alignment method for orthogonal liquid crystals, especially for nematic and smectic A liquid crystal mixtures on plastic substrates.

A preferred application is the orientation of reactive liquid crystal mixtures for the preparation of anisotropic polymeric films.

The reactive liquids crystal are dissolved in a suitable solvent such as toluene and coated as a thin film onto a flexible plastic substrate. When the solvent evaporates and the reactive liquid crystal remains, the liquid crystal has to align instantly, so that high speed roll to roll coating of the plastic substrate is possible. This is achieved by the method described hereafter. The reactive liquid crystal is subsequently polymerised using UV light, which is acting upon a photoinitiator mixed into the reactive liquid crystal, or alternatively by heat, which in turn is acting upon a thermal initiator mixed into the reactive liquid crystal. A polymer film having oriented constituent molecules i.e. monomer molecules is thus produced. It is well known that photopolymerisation of aligned reactive liquid crystals gives rise to polymer films having molecules aligned in the same way as the monomer reactive liquid crystal, thus freezing or stabilizing the director orientation of the liquid crystal and preserving it's anisotropic properties. Such films are characterized by and useful for their optical properties. They are uniaxial, positive birefringent films.

BACKGROUND OF THE INVENTION

Homeotropic alignment of a liquid crystal occurs when the long axes of the molecules of the liquid crystal phase are, on average, essentially normal to the substrate upon which they form a thin film. Very few materials spontaneously align in this way and thus some kind of aligning agent is required to produce this desired alignment. Orthogonal liquid crystal phases like nematic liquid crystal phases and orthogonal smectic phases (e.g. smectic A and smectic B) can be aligned in this way. An Overview about orientation technologies for liquid crystals is given e.g. in J. Cognard, Molecular Crystals Liquid Crystals 78 Supplement 1 (1981) pp 1–77 and in JA. Castellano MCLC, 94 (1983) pp 33–41.

Conventional aligning agents for liquid crystals are designed to be effective on glass substrates, some examples of such conventional organic aligning agents are lecithin, trichloro- and trimethoxypropyl silane, hexadecyl trimethyl ammonium halides and alkyl carboxylato monochromium salts. In each case a very small amount (of typically less than 1%) of the active component is dissolved in a suitable volatile solvent and spread onto the substrate e.g. by spin coating or other well known methods, when the solvent has been evaporated, a thin film of the organic aligning agent remains on the substrate. These materials are characterized by having a polar end group which is assumed to be attracted to the polar glass surface and a long alkyl chain which orientates normal to the glass surface. In some cases a chemical reaction is essential i.e. in the case of chlorosilanes which react with hydroxyl groups on the glass surface. Spontaneous homeotropic alignment of liquid crystals occurs on such surfaces.

Inorganic aligning agents can also be used. For example it is well known that evaporation at normal incidence of $SiO_2$ or $MgF_2$ onto a substrate of glass can be used to produce homeotropic alignment of liquid crystals.

This patent application, however, relates to the alignment of orthogonal liquid crystal phases especially of nematic and of smectic A liquid crystals on a plastic substrate. The plastic substrates are preferably flexible substrates and may be plastic films or also anisotropic liquid crystal polymer films. It was found that the conventional aligning agents are not effective for the alignment of liquid crystals on such plastic substrates. Typically and almost generally either no alignment or only very poor alignment is exhibited. It is suspected that the surface of the plastic substrate has much less affinity for the polar end groups of the aligning agents.

In contrast to the conventionally used organic aligning agents, inorganic aligning agents such as typically used on glass surfaces e.g. $SiO_2$ have been found to provide good homeotropic alignment when sputter coated or evaporated onto plastic substrates. It was found, however, that $TiO_2$-coated substrates do not align so well and are more difficult to wet with the usual coating solvents. One of the problems with these types of coatings which is common to $SiO_2$, $TiO_2$ and others, is that they tend to have a significant surface roughness which prevents the polymer film being released from the aligning layer after polymerisation. This could be attributed to the well known fact that adhesion is very much enhanced by using microscopically rough surfaces compared to smoother surfaces. As these coatings are usually deposited onto a high temperature stable substrate such as polyethylene terephtalate (PET) which, due to the stretching processes used in its manufacture, is birefringent the aligned polymer film must be removed from the substrate before the optical properties of the coated polymer itself are accessible.

SUMMARY OF THE INVENTION

This invention relates to a technique which can be used to quickly align orthogonal liquid crystals especially nematic and smectic A liquid crystals on plastic substrates and which is applicable to roll to roll coating of plastic substrates. It was found that certain organic and inorganic surfactants can be used to provide homeotropic alignment on plastic substrates. This will be explained in the following.

One type of such organic surfactants is the family of perfluoroalkyl sulphonates represented by the surfactant FC 431 (tradename of commercial product obtainable from the 3M company, USA) which is a liquid dissolved in a solvent. When added to the reactive liquid crystal (20% solids), in toluene at a concentration of from 0.1 to 0.5% and preferred at a concentration of from 0.7 to 0.4% it promotes homeotropic alignment on plastic surfaces such as triacetyl cellulose (TAC), (available from the Lonza company in Switzerland) or polyethylene terephthalate (PET), (available from the ICI company in England under the tradename of Melinex 401). To improve the alignment, corona discharge (CD) treatment of the substrate has been found to be helpful. This possibly could be attributed to the CD treatment increasing the polarity of the surface by the formation of hydroxyl and carbonyl groups. However, the alignment process even with a CD treatment is rather slow, taking some seconds after the solvent has evaporated, which has a detrimental effect on the speed at which any coating process can proceed and consequently is not acceptable. The aligning agent has to migrate from the bulk to the surface which appears to have little attraction for it. Thus the alignment process is both weak and slow.

A further topic of the present invention is to induce this type of surfactant to align faster whilst also making it into a form that is suitable for roll to roll coating applications. As the surfactant is a liquid and thus it is practically not possible to coat it onto the surface of the substrate if the substrate is in the form of a roll, unless two or more coating stations are available. However, surprisingly if the FC431 is embedded in a UV curable polymer C3 film which is coated onto the substrate and subsequently UV cured, the resultant polymer film with the surfactant retains its alignment capabilities and the alignment is now much faster and thus allowing a highly desirable greater coating speed.

We found that surfactants can be fixed on the surface e.g. by making e.g. a mixture of 5% surfactant in an acrylate monomer mixture such as a mixture of hexanediol diacrylate and ethylhexylacrylate and 4% Irgacure 907 and coating this onto the PET (or TAC) film and then photocuring the mixture. This provides a faster alignment.

The active polymerizable component can be a monomer or a mixture of monomers or a mixture of monomers and oligomers. They can be anisotropic but preferably are isotropic compounds.

The preferred concentration range for the surfactant in the monomer or monomer mixture or monomer oligomer mixture has been found to be from 2 to 8% surfactant. Especially preferred are concentrations of from 4 to 6%.

Suitable UV curable polymers which are useful to embed the aligning agent can be made from mixtures of known available mono-, di- and tri-acrylates such as 2-methyl hexylacrylate and hexane diol diacrylate. It is further often helpful to also incorporate mono- and diacrylated oligomers which can be based on all the common materials such as urethanes or esters. A wide range of such compounds is available from UCB, Belgium and other suppliers of UV curable resins. These other reactive compounds are used to improve other properties such as better durability, flexibility, hardness and different surface energies to aid wetting.

In a preferred embodiment of the invention the reactive mesogenic compounds used in the mixture of the polymerizable mesogenic material are compounds of formula I

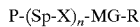

P-(Sp-X)$_n$-MG-R    I wherein
P is a polymerizable group,
Sp is a spacer group having 1 to 20 C atoms,
X is a group selected from —O—, —S—, —CO—, —COO—, —OCO—, —OCO—O— or a single bond,
n is 0 or 1,
MG is a mesogenic or mesogenity supporting group, preferably selected according to formula II

-(A$^1$-Z$^1$)$_m$-A$^2$-Z$^2$-A$^3$-    II wherein
A$^1$, A$^2$
and A$^3$ are independently from each other 1,4-phenylene in which, in addition, one or more CH groups may be replaced by N, 1,4-cyclohexylene in which, in addition, one or two non-adjacent CH$_2$ groups may be replaced by O and/or S, 1,4-cyclohexenylene or naphthalene-2, 6-diyl, it being possible for all these groups to be unsubstituted, mono- or poly-substituted with halogen, cyano or nitro groups or alkyl, alkoxy or acyl groups having 1 to 7 C atoms wherein one or more H atoms may be substituted by F or Cl,
Z$^1$ and Z$^2$ are each independently —COO—, —OCO—, —CH$_2$CH$_2$—, —OCH$_2$—, —CH$_2$O—, —CH=CH—, —C≡C—, —CH=CH—COO—, —OCO— CH=CH— or a single bond and
m is 0, 1 or 2,
and
R is an alkyl radical with up to 25 C atoms which may be unsubstituted, mono- or polysubstituted by halogen or CN, it being also possible for one or more non-adjacent CH$_2$ groups to be replaced, in each case independently from one another, by —O—, —S—, —NH—, —N(CH$_3$)—, —CO—, —COO— —OCO—, —OCO— O—, —S—CO—, —CO—S— or —C≡C— in such a manner that oxygen atoms are not linked directly to one another, or alternatively R is halogen, cyano or has independently one of the meanings given for P-(Sp-X)$_n$-.

Particularly preferred are polymerizable mixtures comprising at least two reactive mesogenic compounds at least one of which is a compound of formula I.

In another preferred embodiment of the invention the reactive mesogenic compounds are selected according to formula I, wherein R has one of the meanings of P-(Sp-X)$_n$— given above.

Mesogenic compounds containing two or three rings are preferred.

Halogen is preferably F or Cl, most preferred it is F.

Of the compounds of formula I especially preferred are those in which R is F, Cl, cyano, alkyl or alkoxy or has the meaning given for P-(Sp-X)$_n$-, and MG is of formula II wherein Z$^1$ and Z$^2$ are —COO—, —OCO—, —CH$_2$— CH$_2$—, —CH=CH—COO—, —OCO—CH=CH— or a single bond.

A smaller group of preferred mesogenic groups of formula II is listed below. For reasons of simplicity, Phe in these groups is 1,4-phenylene, PheL is a 1,4-phenylene group which is substituted by at least one group L, with L being F, Cl, CN or an optionally fluorinated alkyl, alkoxy or acyl group with 1 to 4 C atoms preferably L is F or CH$_3$, and Cyc is 1,4-cyclo-hexylene.

| | |
|---|---|
| -Phe-Z$^2$-Phe- | II-1 |
| -Phe-Z$^2$-Cyc- | II-2 |
| -PheL-Z$^2$-Phe- | II-3 |
| -PheL-Z$^2$-Cyc- | II-4 |
| -Phe-Z$^2$-PheL- | II-5 |
| -Phe-Z$^1$-Phe-Phe- | II-6 |
| -Phe-Z$^1$-Phe-Cyc- | II-7 |
| -Phe-Z$^1$-Phe-Z$^2$-Phe- | II-8 |
| -Phe-Z$^1$-Phe-Z$^2$-Cyc- | II-9 |
| -Phe-Z$^1$-Cyc-Z$^2$-Phe- | II-10 |
| -Phe-Z$^1$-Cyc-Z$^2$-Cyc- | II-11 |
| -Phe-Z$^1$-PheL-Z$^2$-Phe- | II-12 |
| -Phe-Z$^1$-Phe-Z$^2$-PheL- | II-13 |
| -PheL-Z$^1$-Phe-Z$^2$-PheL- | II-14 |
| -PheL-Z$^1$-PheL-Z$^2$-Phe- | II-15 |
| -PheL-Z$^1$-PheL-Z$^2$-PheL- | II-16 |

In these preferred groups Z$^1$ and Z$^2$ have the meaning given in formula II described above. Preferably Z$^1$ and Z$^2$ are —COO—, —OCO—, —CH$_2$CH$_2$— or CH=CH— COO—. L is preferably F, Cl, CN or methyl, methoxy, ethyl, ethoxy, oxamethyl, oxaethyl or trifluormethyl.

If R is an alkyl or alkoxy radical, i.e. where the terminal CH$_2$ group is replaced by —O—, this may be straight-chain or branched. It is preferably straight-chain, has 2, 3, 4, 5, 6, 7 or 8 carbon atoms and accordingly is preferably ethyl, propyl, butyl, pentyl, hexyl, heptyl, octyl, ethoxy, propoxy, butoxy, pentoxy, hexoxy, heptoxy, or octoxy, furthermore methyl, nonyl, decyl, undecyl, dodecyl, tridecyl, tetradecyl, pentadecyl, methoxy, nonoxy, decoxy, undecoxy, dodecoxy, tridecoxy or tetradecoxy.

Oxaalkyl, i.e. where one $CH_2$ group is replaced by —O—, is preferably straight-chain 2-oxapropyl (=methoxymethyl), 2- (=ethoxymethyl) or 3-oxabutyl (=2-methoxyethyl), 2-, 3-, or 4-oxapentyl, 2-, 3-, 4-, or 5-oxahexyl, 2-, 3-, 4-, 5-, or 6-oxaheptyl, 2-, 3-, 4-, 5-, 6- or 7-oxaoctyl, 2-, 3-, 4-, 5-, 6-, 7- or 8-oxanonyl or 2-, 3-, 4-, 5-, 6-, 7-, 8- or 9-oxadecyl.

R optionally can be a chiral group. Compounds with a chrial group R in most cases, however, are not preferred in mixtures with a nematic phase which are the preferred mixtures according to the instant invention. In case of R being a chiral group it is preferably selected of the following formula

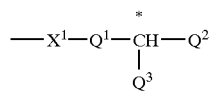

wherein
$X^1$ has the meaning given for X,
$Q^1$ is an alkylene or alkyleneoxy group with 1 to 10 C atoms or a single bond,
$Q^2$ is an alkyl or alkoxy group with 1 to 10 C atoms which may be unsubstituted, mono- or polysubstituted by halogen or CN, it being also possible for one or more non-adjacent $CH_2$ groups to be replaced, in each case independently from one another, by —C≡C—, —O—, —S—, —NH—, —N(CH$_3$)—, —CO—, —COO—, —OCO—, —OCO—O—, —S—CO— or —CO—S— in such a manner that oxygen atoms are not linked directly to one another, or alternatively has the meaning given for P-Sp-,
$Q^3$ is halogen, a cyano group or an alkyl or alkoxy group with 1 to 4 C atoms different from $Q^2$.

In case chiral groups are used the preferred chiral groups are 2-butyl (=1-methylpropyl), 2-methylbutyl, 2-methylpentyl, 3-methylpentyl, 2-ethylhexyl, 2-propylpentyl, 2-octyl, in particular 2-methylbutyl, 2-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-nonyl, 2-decyl, 2-dodecyl, 6-methoxyoctoxy, 6-methyloctoxy, 6-methyloctanoyloxy, 5-methylheptyloxycarbonyl, 2-methylbutyryloxy, 3-methylvaleroyloxy, 4-methylhexanoyloxy, 2-chlorpropionyloxy, 2-chloro-3-methylbutyryloxy, 2-chloro-4-methylvaleryloxy, 2-chloro-3-methylvaleryloxy, 2-methyl-3-oxapentyl, 2-methyl-3-oxahexyl, 1-methoxypropyl-2-oxy, 1-ethoxypropyl-2-oxy, 1-propoxypropyl-2-oxy, 1-butoxypropyl-2-oxy, 2-fluorooctyloxy, 2-fluorodecyloxy, for example.

In addition, mesogenic compounds of the formula I containing an achiral branched group R may occasionally be of importance as comonomers, for example, as they reduce the tendency towards crystallization. Branched groups of this type generally do not contain more than one chain branch. Preferred achiral branched groups are isopropyl, isobutyl (=methylpropyl), isopentyl (=3-methylbutyl), isopropoxy, 2-methylpropoxy and 3-methylbutoxy.

It his however also possible to use reactive compounds with chiral groups selected from the following groups:

a cholesteryl group,

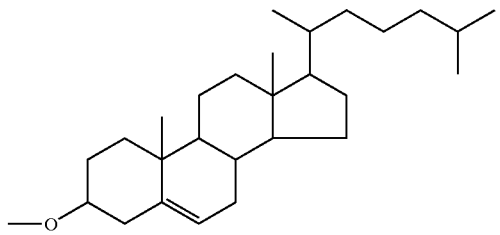

an ethylenglycol derivative

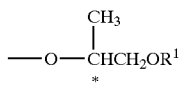

wherein $R^1$ is an alkyl radical with 1 to 12 C atoms, a terpenoid radical like, for example, menthol

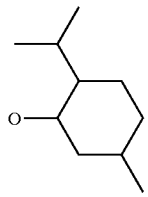

or a group based on citronellol.

Preferably R is an achiral group. In orthogonal smectic phases the influence of chiral compounds generally is rather small.

P is preferably selected form $CH_2$=CW-COO—, WCH=CH—O—,

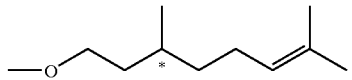

or $CH_2$=CH-Phenyl-(O)$_k$— with W being H, $CH_3$ or Cl and k being 0 or 1,

P is particularly preferably a vinyl group, an acrylate group, a methacrylate group, a propenyl ether group or an epoxy group, very particularly preferably an acrylate group.

As for the spacer group Sp all groups can be used that are known for this purpose to those skilled in the art. The spacer group Sp is preferably linked to the polymerizable group P by an ester or ether group or a single bond. The spacer group Sp is preferably a linear or branched alkylene group having 1 to 20 C atoms, in particular 1 to 12 C atoms, in which, in addition, one or more non-adjacent $CH_2$ groups may be replaced by —O—, —S—, —NH—, —N(CH$_3$)—, —CO—, —O—CO—, —S—CO—, —O—COO—, —CO—S—, —CO—C—, —CH(halogen)-, —CH(CN)—, —CH=CH— or —C≡C—.

Typical spacer groups are for example —(CH$_2$)$_o$—, —(CH$_2$CH$_2$O)$_r$—CH$_2$CH$_2$—, —CH$_2$CH$_2$—S—CH$_2$CH$_2$— or —CH$_2$CH$_2$—NH—CH$_2$CH$_2$—, with o being an integer from 2 to 12 and r being an integer from 1 to 3.

Preferred spacer groups are ethylene, propylene, butylene, pentylene, hexylene, heptylene, octylene, nonylene, decylene, undecylene, dodecylene, octadecylene, ethyleneoxyethylene, methyleneoxybutylene, ethylene-thioethylene, ethylene-N-methyl-iminoethylene and 1-methyl-alkylene, for example.

In the event that R or $Q^2$ is a group of formula P-Sp-X- or P-Sp- respectively, the spacer groups on each side of the mesogenic core may be identical or different.

In particular, preferred are compounds of formula I wherein n is 1.

In another preferred embodiment, the inventive compensator is obtained by copolymerizing mixtures comprising compounds of formula I wherein n is 0 and compounds of formula I wherein n is 1.

Typical examples representing polymerizable mesogenic compounds of the formula I can be found in WO 93/22397; EP 0,261,712; DE 195,04,224; DE 4,408,171 or DE 4,405,316. The compounds disclosed in these documents, however are to be regarded merely as examples that should not limit the scope of this invention.

Furthermore, typical examples representing polymerizable mesogenic compounds are shown in the following list of compounds, which is, however, to be understood only as illustrative without limiting the scope of the present invention:

a2) 0 to 90% by weight of at least one mesogen according to formula I and II having two or more polymerizable functional groups,
b) 0.01 to 5% by weight of an initiator,
c) 0 to 20% by weight of a non-mesogenic compound having two or more polymerizable functional groups,
d) 0 to 1000 ppm of a stabilizer, and
e) 0 to 2% of an organic surfactant.

In a particularly preferred embodiment of the invention the mixture of the polymerizable mesogenic material comprises 15 to 99% by weight of at least one mesogen of component a1) and further comprises at least 5% of at least one mesogen of compound a2), components b) and optionally c) and d) as described above.

In a preferred embodiment the mixture contains at least 0.1% to 1.5% of the organic surfactant, component e) above.

The mixture according to this particularly preferred embodiment preferably comprises one, two or three different mesogens according to formula I and II having one polymerizable functional group.

Most preferably the mixture according to this particularly preferred embodiment comprises two or more, in particular two to six, very particularly two to three different mesogens according to formula I and II having one polymerizable functional group.

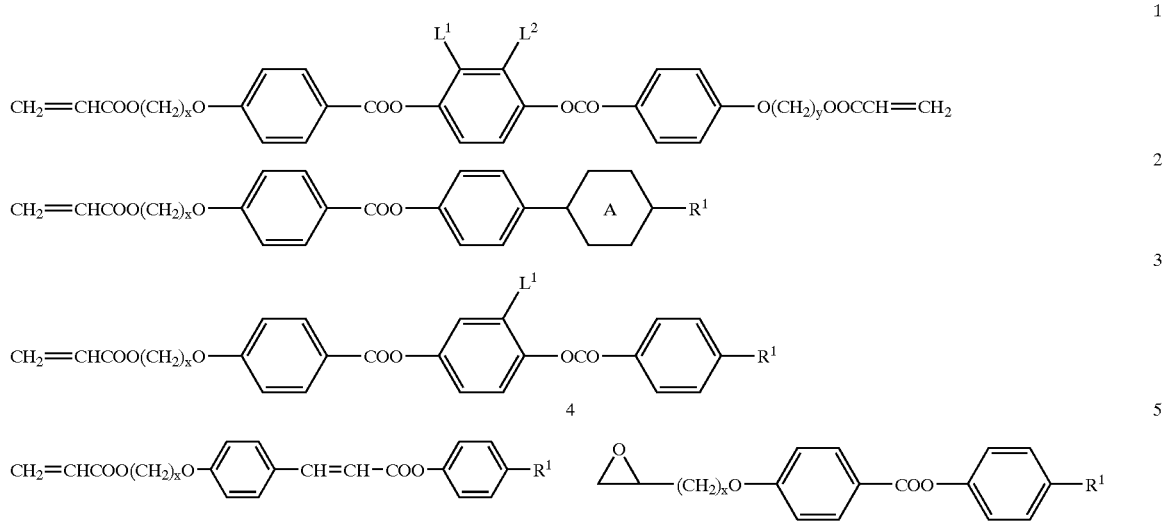

In these compounds Nos. 1 to 5 x and y are each independently 1 to 12, A is a 1,4-phenylene or 1,4-cyclohexylene group, $R^1$ is halogen, cyano or an alkyl or alkoxy group with 1 to 12 C atoms and $L^1$ and $L^2$ are each independently H, Halogen, CN, or an alkyl, alkoxy or acyl group with 1 to 7 C atoms.

The reactive mesogenic compounds disclosed in the foregoing and the following can be prepared by methods which are known per se and which are described in the documents cited above and, for example, in standard works of organic chemistry such as, for example, Houben-Weyl, Methoden der organischen Chemie, Thieme-Verlag, Stuttgart.

In a preferred embodiment of the present invention, the compensation film is obtainable from a mixture of a polymerizable mesogenic material comprising the following components
a1) 10 to 99% by weight of at least one mesogen according to formula I and II having one polymerizable functional group, The ratio of each of the mesogens according to formula I and II having one polymerizable functional group in the mixture according to this particularly preferred embodiment is preferably 5 to 90, in particular 10 to 80, very preferably 15 to 65% by weight of the total mixture.

In the mixture according to the particularly preferred embodiment described above, preferably each of the different mesogens according to formula I and II is different in at least one of the groups P, Sp, X, A', $A^2$, $A^3$, Z', $Z^2$ and R from each other of the mesogens.

The mixture according to this particularly preferred embodiment especially preferably contains from 2 to 10% by weight, very especially preferably from 5 to 10% of at least one of the compounds of component a2).

In another particularly preferred embodiment of the present invention, the mixture of the polymerizable mesogenic material comprises
a1) 15 to 85% by weight of at least one mesogen according to formula I and II having one polymerizable functional group, a2) 5 to 80% by weight of at least one mesogen according to formula I and II having two or more polymerizable functional groups, and further comprises component b) and optionally component c) and d) as described above.

In one embodiment of the instant invention the organic surfactant is used in a concentration of 0.01 to 1% and especially preferred in 0.1 to 0.5%, in particular 0.1 to 0.3% are used.

In a preferred enbodiment, however, the surfactant is used in a matrix of a polymerizable acrylate monomer or mixture of such monomers and/or oligomers. Then obviously generally no surfactant is required in the mixture of anisotopic reactive monomers which are aligned to form the anisotopic layer or film.

In both embodiments described above sulfonate surfactants are preferred. Especially preferred are fluorinated sulfonate surfactants.

The precursor of the aligning layer contains preferably non mesogenic acrylates and non mesogenic oligomers together with the surfactant and an appropriate initiator, which preferably is a UV initiator. A concentration of from 2 to 10% especially of from 4 to 6% of surfactant in a mixture of monoacrylates and diacrylates and/or oligomers has found to work very well. Especially preferred are mixtures containing at least one monoacrylate, one diacrylate and one oligomer together with the surfactant and the initiator. The concentrations of the monoacrylate in the mixtures are preferably from 10 to 80%, those of the diacrylate monomers from 10 to 50% and those of the oligomers from 10 to 50%. The oligomers are preferably multifunctional poly urethanes or poly esters. The photoinitiator is used in a concentration from 3 to 6%, a typical example of a photoinitiator being Irgacure 907. The mixture is coated from toluene or methyl ethyl ketone. A 10 to 20% solution provides a thin film with a thickness of below 2 $\mu$m. The film thickness is not very crucial. However, preferably the film thickness is from 0.5 to 5 $\mu$m most preferably from 0.5 to 1.5 $\mu$m.

Without further elaboration one skilled in the art can, using the preceding description, utilize the present invention to its fullest extent. The following examples are, therefore, to be construed as merely illustrative and by no means limiting the remainder of the disclosure in any way whatsoever.

In the foregoing and in the following examples, unless otherwise indicated, all temperatures are set forth uncorrected in degrees Celsius and all parts and percentages are by weight. All physical data are given for a temperature of 20° C. unless explicitly stated otherwise. The following abbreviations are used to illustrate the liquid crystalline phase behaviour of the compounds:

K=crystalline; N=nematic; S=smectic; Ch=cholesteric; I=isotropic. The numbers between these symbols indicate the phase transition temperatures in degree Celsius.

Other components such as wetting agents and adhesion promoters (available from Cray Valley, USA and Akzo Ltd, Netherlands for example) can also be added to aid coating of the film. Such compounds can also lead to homeotropic alignment. An example for substances which is used as a typical adhesion promoter, which at the same time leads to homeotropic alignment are epoxy acrylate adhesion promoters, e.g. Crodomer UVE-150 from Croda, UK. Typically from 0.01% to 1% of the compound or compounds is/are added, to the mixture of reactive mesogens (the reactive liquid crystal mixture). A preferred concentration for the use of these compounds is from 0.05 to 0.2% and especially about 0.1%.

For UV curable systems photoinitiators such as Irgacure 907, 184, 651 and 369 and Daracur 1173 (all available form Ciba Geigy, Switzerland) have also to be added to create free radicals under the influence of UV light and promote polymerisation of the acrylates. Alternatively thermal photoinitiators such as benzoyl peroxide can also be used if the cure mechanism was to be induced by heat, however this is generally less convenient and consequently not preferred.

Other perfluoroalkyl sulphonate surfactants such as FC430 (also available from the 3M company, USA) also behave in the same way, as FC431 which is given as a typical example of the use of perfluoroalkyl sulphonates only. A further suitable fluorosurfactant is FC 723 also of 3M company. A wide range of similar useful surfactants are available from the 3M company. Also other perfluoro based surfactants can be beneficially used.

Additionally, inorganic aligning agents are well known to be used on glass substrates and when coated onto the substrate surface are also effective aligning agents on plastic substrates, in contrast to conventional organic aligning agents. However, the surface roughness inherent to these inorganic coatings (i.e. using no additional spacers) is a major problem because this together with the high surface energy of the films, which typically is in the range of some tens of dynes e.g. 60 dynes, prevents the film beeing easily released from the surface after UV curing of the reactive liquid crystal. In some cases it is possible to use release agents in the coating solution to aid release of the polymer film. However, these release agents in may cases have an adverse effect on the alignment and in some cases cause a fine liquid deposit to occur in the film. This effect is also called blooming of the film. In order to over come these negative effects preferably no release agents are applied.

It was found that these problems can be overcome by the use of substrates which have been coated with aluminium or sufficiently smooth $Al_2O_3$. The substrate can be any suitable plastic such as TAC, polyethylene terepthalate, polyethylene naphthenate, polyamides, and any other plastic; but usually the substrate is PET because it is robust and readily available as a commodity item used extensiveley in the packaging industry. In the case aluminium coated substrates are used the same mixtures of reactive liquid crystals can be used as described above. Here, however, the use of a surfactant is optional only.

Aluminium coated PET is commercially available in many grades of surface finish and with various aluminium thickness and PET thickness. Of necessity, coatings of aluminium have a surface coating of aluminium oxide on them but as the aluminium coating can be obtained in a very smooth form, which is required to provide a desired high reflectivity, the oxide layer is also very smooth, unlike the aluminium oxide coatings obtainable by evaporation methods or by sputtering which all tend to give more porous and rougher surfaces, similar to those which are used e.g. for $SiO_2$ to align liquid crystals on glass substrates. Smoother $Al_2O_3$ coatings are also suitable but they are generally less easily available. An exception, however, are the $Al_2O_3$ coatings on PET films used in transparent food packaging. Consequently such high reflectivity aluminium coatings and thin transparent $Al_2O_3$ coatings, are preferred for the instant invention. Low optical density aluminium coatings, with optical densities from below 0.5 to below 1.0 OD, are not so desirable, because the alignment they induce tends to be not uniform. Thicker, medium and high optical density aluminium coatings are preferred, as these give uniform coatings. Medium density aluminium coatings have an optical density from 1.0 to 2.0 OD, whereas high density aluminium coatings have an optical density of more than 2.0 OD.

The reflective and conductive nature of the aluminium layer has so far precluded its consideration as an alignment layer in liquid crystal displays with glass substrates. For the application described here, these considerations are however less relevant.

Depending on the accuracy and coat weight of the final film a wide range of coating techniques can be used to coat the reactive liquid crystal mixture solution onto the web. A non exhasutive list of examples is: three roll reverse coating, flexo, gravure, micro-gravure, slot die and metered slot die.

The photopolymerisation of the inventive films can be carried out using medium or high pressure mercury lamps which are advantageously filtered using water or dichroic filters to remove light with short wavelengths and reduce the heating effect, as this undesired effect otherwise can cause the reactive liquid crystal mixture to be heated above its clearing point and thus eliminate the liquid crystal phase. Other lamps such as metal halogen lamps and incandescent tubes can also be used but an inert gas atmosphere would typically be required to allow full surface cure in these cases. Typically used are mercury UV lamps with about 80–100 watts/cm irradiation. The emitted light is in the wave length range from 300 to 400 nm.

The UV curing of the aligned polymer film has to proceed at not too high temperatures, as otherwise, especially at longer curing times the optical retardation of the final film will be reduced. Preferred are curing times at from 1 second to 5 minutes and especially from 10 seconds to 2 minutes. The most preferred temperatures during curing are above ambient temperature and about 20 degrees below the clearing point of the reactive liquid crystal mixture. It is generally preferred to cure the mixture as far as possible into the nematic phase (i.e. at as low a temperature as possible). Preferably the curing is performed about at least 65° below the clearing point and especially preferred at least 70° below the clearing point. Especially preferred are 20° C. to 50° C. and in particular 20° C. to 40° C.

The homeotropically aligned polymer films made on aluminised PET or alternatively on polymer/surfactant surfaces can be removed from the PET substrate by pulling them off with a pressure sensitive adhesive coated onto a non-birefringent substrate such as TAC. The alignment and thickness of the films can be quantified by measuring the retardation of the film at some angle away form normal incidence. For a homeotropic film the retardation value is symmetrical about normal incidence. Several methods for measuring retardation are available such as the Berek compensator and polarising microscope (both available form Olympus Microscopes). Qualitatively the film appears black between crossed polarisers.

The reactive liquid crystals can be of any form such that they exhibit nematic or orthogonal smectic phases. However most preferred are the compounds described and listed above.

Besides the acrylates mentioned as examples other reactive groups can also be used such as methacrylates, haloacrylates and epoxies or vinyl ethers. The latter of which will require the use of cationic photoinitiators.

In the case of nematic liquid crystals it is essential to cure the films below the clearing point of the nematic liquid crystal mixture and not to allow the film temperature to reach the temperature of the isotropic liquid phase, indeed it is preferred to cure the film some 60 degrees centigrade below the clearing point so that small local changes in temperature do not affect the birefringence of the film.

In the case of smectic phases, curing preferably takes place within the smectic phase but the constraints on temperature within the limiting temperatures of the smectic phase are not so critical as the birefringence changes only slightly with temperature in smectic phases.

The alignment process of this invention can be beneficiously applied to homeotropically align all kinds of orthogonal liquid crystals.

Preferably it can be used to align conventional monomeric non-polymerizable liquid crystals. The oriented layers then are use e.g. in the electrooptical display devices, optical compensation layers or as active switching layers e.g. in ECB or in Guest-host devices.

Most preferably according to this invention the oriented liquid crystals are reactive, polymerizable compounds, which can be either nematic or orthogonal smectic. Polymerized films of these materials are obtained by curing the layers in appropriate way and thus preserving their anisotropic orientation. These films can be removed from the substrates and also be laminated on other substrates if required. They are beneficially used to compensate optically anisotropic systems such as liquid crystal displays either alone or in combination with further anisotropic and/or isotropic films. These multilayered films are also subject of the instant invention.

Especially it is possible by the newly invented alignment method disclosed here to use one of the other layers of such a multilayered film, which typically are organic films themselves, as the substrate, due to the good alignment characteristics of the inventive alignment layers on organic substrates.

EXAMPLES

Example 1

A mixture containing FC 430 (1%) (available from 3M, USA), Rexam Hardcoat (3%) (available from Rexam Custom Ltd., Wrexham, Wales and consisting of a mixture of acrylates, oligomers, adhesion promoters and photoinitiators), propane-2-ol (62%), toluene (16%), n-heptane (16%), and Irgacure 907 (2%) (available from Ciba Geigy Ltd) was coated onto Melinex 401 (available from ICI) to give a wet weight of 10–20 g/m$^2$. Three experiments were performed with wet weights of 10, 15 and 18 g/m$^2$ respectively they are called Examples 1a), 1b) and 1c), respectively.

The film carrying the aligning layer was subsequently coated with 20% of a reactive liquid crystal mixture RM1 dissolved in toluene to give a wet film weight of about 15 g/m$^2$. Upon evaporating off the solvent at 50° C., homeotropic alignment was quickly achieved in less than 1 second and the monomer film polymerised by UV curing in air by exposure to a medium pressure mercury UV lamp (under the conditions given in this example above). Alternatively the UV curing was also performed in nitrogen atmosphere with smilar success. The homeotroically aligned polymer film thickness was about 3 microns.

The term wet weight here describes the weight of the solvent including the reactive mesogens i.e. as it is coated and before if the solvent is evaporated off. Then the film is passed through an oven at 50° C. and cured using a medium pressure mercury UV light source (with a power of 100 Watt/cm located about 5 cm above the film). The cure time is less than 1 second. A clear polymer film resulted.

Reactive liquid crystal mixture RM1 consists of:

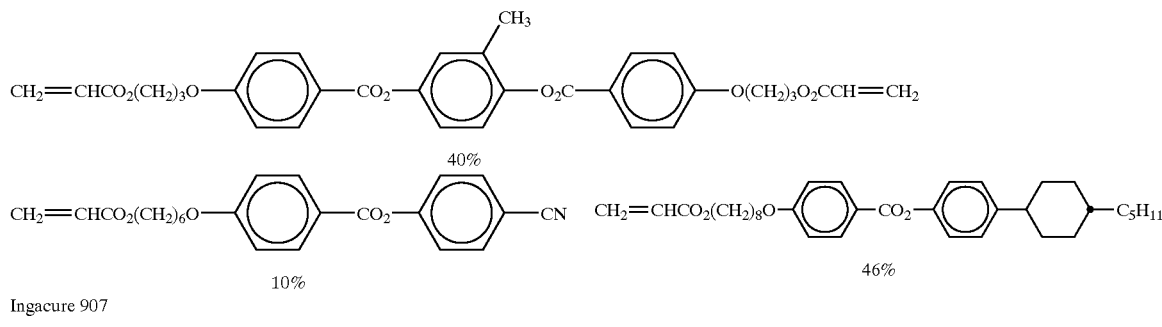

Ingacure 907

4%

RM1 has a clearing point of T(N–I)=130° C.

Example 2

Reactive liquid crystal mixture RM1 from Example 1 was dissolved in toluene to give a solids content of 20% and coated onto aluminised 100 micron thick PET (product Mel 400 obtainable from Rexam Metallising, Thetford, UK). The wet weight of this film being about 20 g/m². The solvent was evaporated by heating the coating to 50° C. for a short period (typically of about 2 minutes) and immediately a clear film was produced. This monomer film was photopolymerised by exposure (typically of 3 seconds) to UV light from a medium pressure mercury UV lamp at a temperature of <50° C.

To examine and use this film it has been removed from the aluminium coated substrate using pressure sensitive adhesive on TAC substrate whereupon a retardation of the film of 64 nm was measured at ambient temperature of about 22° C. and at a wavelength of 550 nm (green light) and at 40° incidence.

Example 3

Reactive mesogen mixture RM2 was dissolved in toluene as a 20% solids solution and coated as in Example 2 onto aluminised PET (Mel 400). Upon evaporation of the solvent a clear film was produced which was subsequently photopolymerised using a medium pressure mercury UV lamp as described in Example 2. The polymer film was removed from the base film and found to have good homeotropic alignment.

Reactive liquid crystal mixture RM2 consists of:

This mixture RM2 exhibits a smectic A phase up to a temperature of 50° C. and further exhibits a nematic phase up to 120° C.

Example 4

As in Example 1a) Melinex 401 was coated with an aligning agent in a mixture of propane-2-ol and toluene. Now, however Crodomer UVE-150 (0.1%) (available from Croda, UK) was used instead of 1% of FC430. The other components were Rexam Hardcoat (3%), propane-2-ol (62.9%), toluene (16%), n-heptane (16%) and Irgacure (2%).

The film was then processed as in Example 1. Again it was coated with reactive liquid crystal mixture RM1 (20% in toluene). Here again homeotropic alignment was readily and quickly achieved; even in about 40 seconds. Homeotropically aligned polymer films of about 3 μm were achieved upon UV curing in air using the conditions of Example 1.

Example 5

The Example 1a) was repeated replacing FC430 (1%) in the solution of the precursor of the aligning agent by FC723 (also 1%) (also available from 3M, USA). The other process steps and conditions of Example 1 were maintained as in Example 1. The wet weight of the film of the aligning agent was 17 g/m², whereas that of the dissolved RM1 was 16 g/m². Again, homeotropic polymer films were obtained. Now at a thickness of slight above 3 μm.

Example 6

As in Example 3 the reactive liquid crystal mixture RM1 of Example 1 was dissolved in toluene (20% solids) and

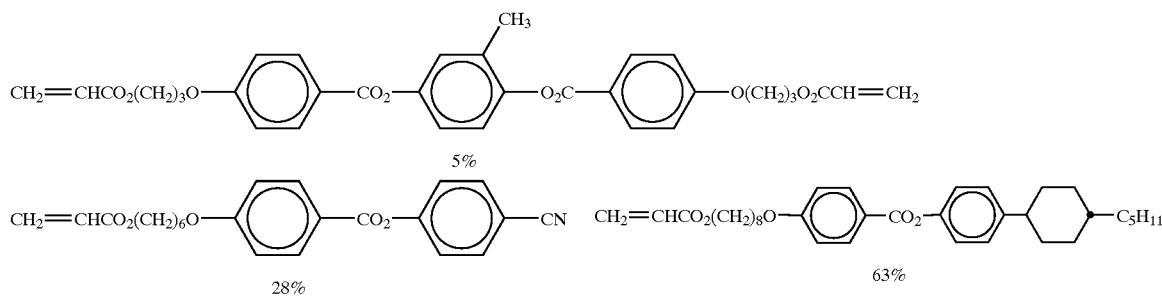

Ingacure 907

4% directly coated onto the substrate sheet to give a wet weight of 36 g/m². Now, however, aluminium oxide coated PET (prepared by Rexam Metallizing, UK) has been used instead of aluminised PET. The film used was 100 micron thick PET customized in it's thickness for this experiment, but otherwise, especially with respect to the aluminium oxide coating, it was identical to the typically 10 to 20 micron thick aluminium oxide coated PET films used in transparent food packaging material.

The retardation of the removed film, which has a dry weight of about 7.3 g/m² was measured as 120 nm at 22° C. under an angle of incidence of 40°.

Example 7

As in Example 6 100 micron thick aluminium oxide coated PET was used as a substrate. Now, like in Example 4, RM2 was used (20% in toluene) as the reactive mesogen mixture. Again a homeotropic polymer film was obtained, which could be successfully removed from the substrate.

Example 8

The Example 2 was repeated, but now the wet weight of the film of the solution of RM1 was 35 g/m². The resultant polymerized film was about 7 microns thick and after transfer was confirmed to have a retardation of 115 nm at 20° C. at 550 nm and 40° incidence.

Example 9

The influence of the wet weight, respectively the dry weight of the film on the resultant optical retardation of the dry cured film was investigated systematically. As in Example 2 20% of RM1 in Toluene were coated onto Mel400 from Rexam. Now, however, the wet weight was systematically varied over a large range in order to obtain dry weights of the films in the range from 3 to 10 g/m². The dry weight was determined from weighing circular samples with a diameter 113 mm of of the substrate with dry film and without the film after it's removal to an accuracy of +/−0.01 g.

It has been found that, within experimental error of a few percent, the wet weight is proportional to the dry weight by the factor of the solids content of the solution. This indicates full evaporation of the solvent. The optical retardation of the cured transferred films at ambient temperature of 22° C. was determined at 550 nm under 40° angle of incidence. The results of the experiments are shown as a formation of the dry weight in FIG. 1 below. Though there is some obvious scatter of the experimental data, which all are averages of at least three independent measurements on one coated film both for the dry weight and the retardation, the results clearly show the increasing retardation with growing dry weight.

Example 10

Example 2 was repeated but now using several different curing temperatures in the range from 22° C. to 55° C. It has been observed that the higher the temperature during the UV curve the lower the resultant retardation was. This could be attributed to the lower order parameter of the reactive liquid crystal mixture which decreases with increasing temperature, leading to a lower effective birefringence, even if during the short curing times most likely thermal equilibrium is not achieved.

BRIEF DESCRIPTION OF THE FIGURES AND FIGURE CAPTION

FIG. 1: Plot of optical retardations of cured transferred films of RM1 as a function of dry coat weight as described in Example 9. All data points are averages of several independent measurements. Retardation at 22° C., 550 nm 40° incidence.

What is claimed is:

1. A liquid crystal film with homeotropic alignment wherein said homeotropic alignment is achieved by an aligning layer on a substrate wherein said aligning layer is an $Al_2O_3$ layer with a surface sufficiently smooth such that liquid a crystal film formed thereon can be removed in one piece, wherein the liquid crystal film is prepared from a mixture comprising a reactive mesogenic compound of formula I

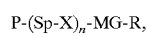

wherein

P is a polymerizable group

Sp is a spacer group having 1 to 20 C atoms,

X is a group selected from —O—, —S—, —CO—, —COO—, —OCO—, —OCO—O— or a single bond;

n is 0 or 1,

MG is a mesogenic or mesogenity supporting group, according to formula II

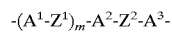      II wherein $A^1$, $A^2$ and $A^3$ are independently from each other 1,4-phenylene in which, in addition, one or more CH groups may be replaced by N, 1,4-cyclohexylene in which, in addition, one or two non-adjacent $CH_2$ groups may be replaced by O and/or S, 1,4-cyclohexenylene or napththalene-2,6-diyl, it being possible for all these groups to be unsubstituted, mono- or poly-substituted with halogen, cyano or nitro groups or alkyl, alkoxy or acyl groups having 1 to 7 C atoms wherein one or more H atoms may be substituted by F or Cl, $Z^1$ and $Z^2$ are each independently —COO—, —OCO—, $CH_2CH_2$—, —$OCH_2$-, —$CH_2O$—, —$CH_2$=CH—, —C≡C—, —CH=CH—COO—, —CO—CH=CH— or a single bond, m is 0, 1 or 2, and R is an alkyl radical with up to 25 C atoms which may be unsubstituted, mono- or polysubstituted by halogen or CN, it being also possible for one or more non-adjacent $CH_2$ groups to be replaced, in each case independently from one another, by —O—, —S—, —NH—, —N($CH_3$)—, —CO—, —COO— —OCO—, —OCO—O—, —S—CO—, —CO—S— or —C≡C— in such a manner that oxygen atoms are not linked directly to one another, or alternatively R is halogen, cyano or has independently one of the meanings given for P-(Sp-X)$_n$-.

2. A liquid crystal film according to claim 1 wherein the substrate is a polymeric material.

3. A liquid crystal film according to claim 2 wherein the substrate is a plastic sheet or film.

4. A liquid crystal film according to claim 1 wherein the substrate prior to its coating with the alignment layer or its precursor is subjected to a corona discharge.

5. A process of fabricating a homeotropically oriented liquid crystal film according to claim 1 which comprises applying an aligning layer as defined in claim 1 on a substrate.

6. An electrooptical system which contains a liquid crystal film according to claim 1.

7. A liquid crystal film as in claim 1, wherein said aligning layer is a thin transparent $Al_2O_3$ coating.

8. A liquid crystal film as in claim 1 prepared from a mixture comprising more than one polymerizable mesogenic compounds.

9. A liquid crystal film according to claim 1 wherein the surface of the smooth $Al_2O_3$ layer is smoother than aluminum oxide coatings obtained by evaporation methods or sputtering.

10. A liquid crystal film according to claim 1 wherein the $Al_2O_3$ layer has fewer pores than aluminum oxide layers prepared by evaporation methods or sputtering.

* * * * *